No. 893,335. PATENTED JULY 14, 1908.
A. C. LODWIG.
CULTIVATOR.
APPLICATION FILED DEC. 26, 1907.
3 SHEETS—SHEET 1.
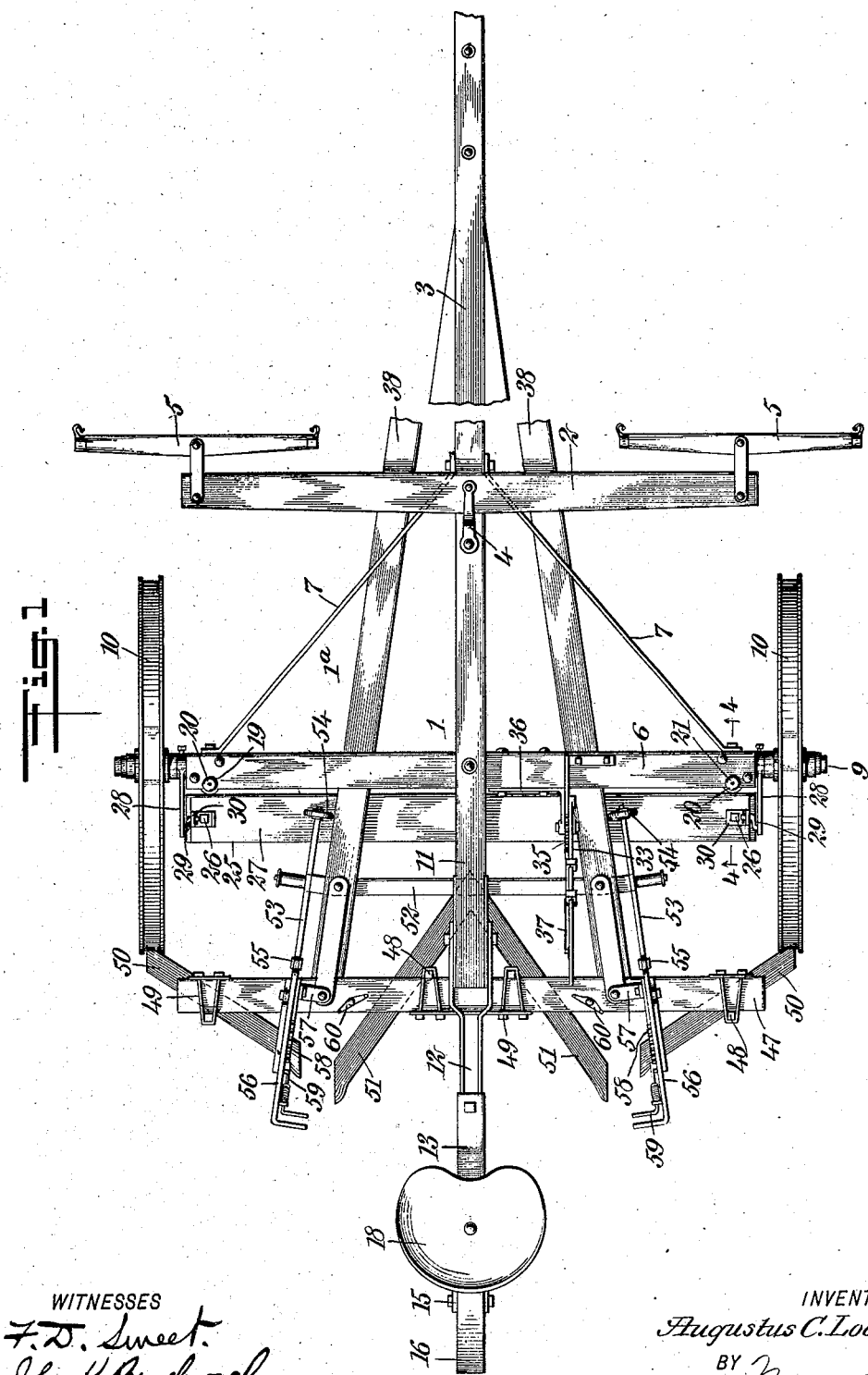
WITNESSES
INVENTOR
Augustus C. Lodwig
BY
ATTORNEYS No. 893,335.
A. C. LODWIG.
CULTIVATOR.
APPLICATION FILED DEC. 26, 1907.
PATENTED JULY 14, 1908.
3 SHEETS—SHEET 2.
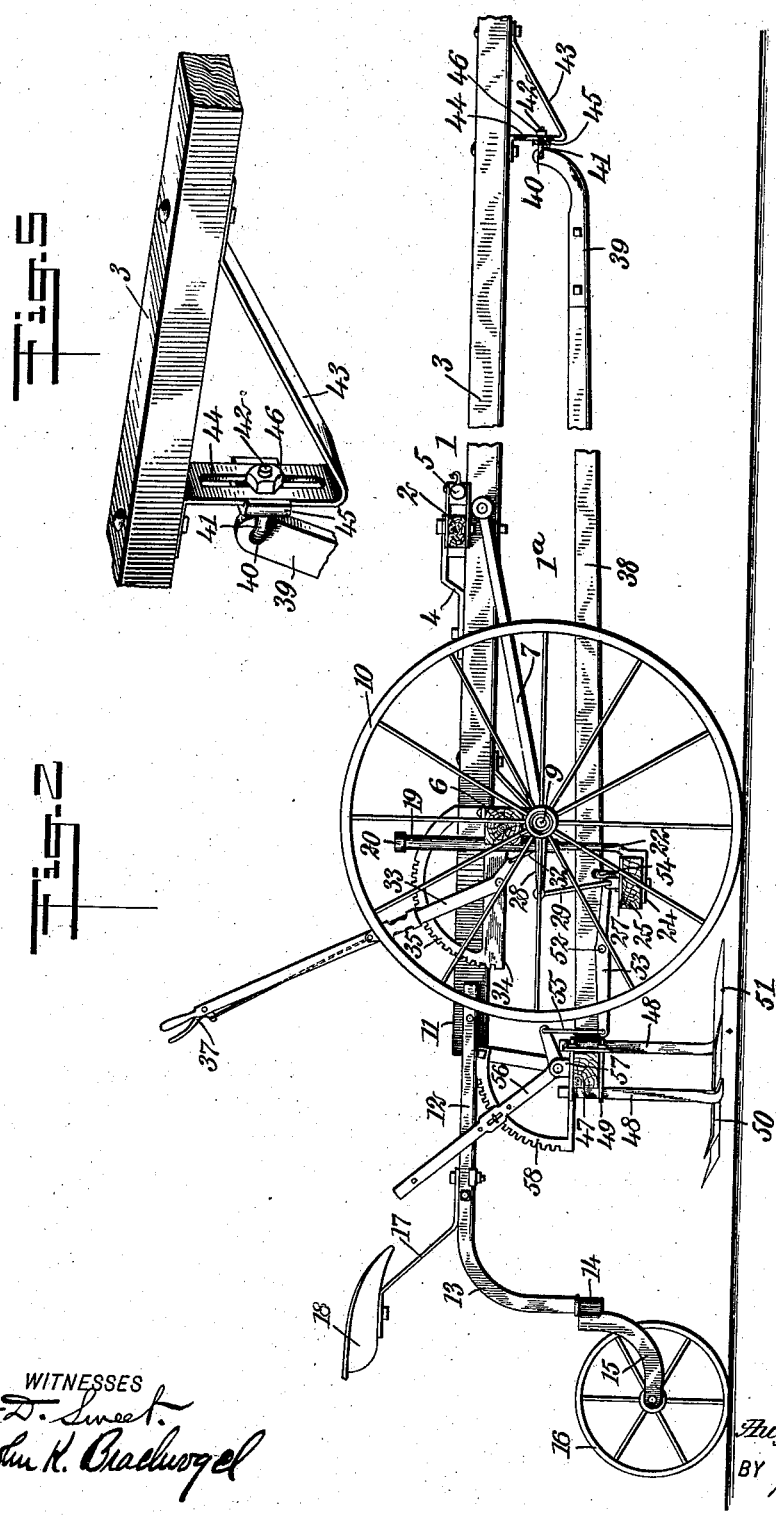
WITNESSES
INVENTOR
Augustus C. Lodwig
BY
ATTORNEYS No. 893,335.
A. C. LODWIG.
CULTIVATOR.
APPLICATION FILED DEC. 26, 1907.
PATENTED JULY 14, 1908.
3 SHEETS—SHEET 3.
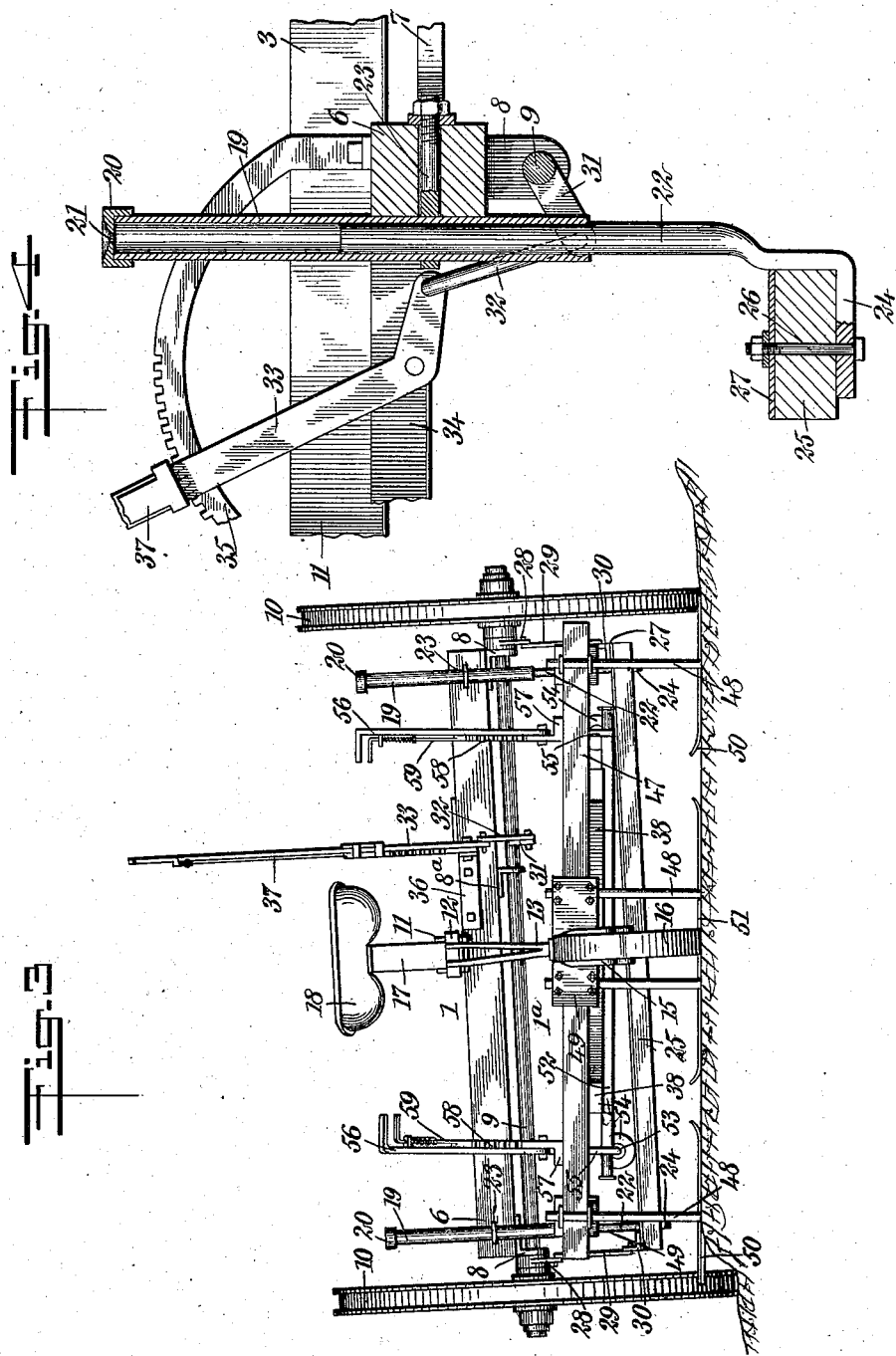
WITNESSES
INVENTOR,
Augustus C. Lodwig
BY
ATTORNEYS

UNITED STATES PATENT OFFICE.

AUGUSTUS CARL LODWIG, OF OXNARD, CALIFORNIA.

CULTIVATOR.

No. 893,335.　　　　Specification of Letters Patent.　　　Patented July 14, 1908.

Application filed December 26, 1907. Serial No. 407,999.

*To all whom it may concern:*

Be it known that I, AUGUSTUS CARL LODWIG, a citizen of the United States, and a resident of Oxnard, in the county of Ventura and State of California, have invented a new and Improved Cultivator, of which the following is a full, clear, and exact description.

This invention relates to cultivators for use in soil tillage.

An object of the invention is to provide a cultivator adapted for use in tilling the soil in agricultural operations, in which the knives or blades can be adjusted to adapt the cultivator for use under different conditions, and in which the operator can control the knives to prevent injury to the vegetation when the cultivator is used upon fields of growing crops.

A further object of the invention is to provide a cultivator in which the knives or blades can be adjusted to alter their positions with respect to the ground, in which the blades can be tilted to adapt the cultivator for use on irregular ground, sloping hillsides and the like, and in which the operator can always control the knives with ease and rapidity.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which Figure 1 is a plan view of the cultivator; Fig. 2 is a side elevation of the cultivator; Fig. 3 is a rear elevation of the same, showing it in use upon irregular ground; Fig. 4 is an enlarged transverse section, on the line 4—4 of Fig. 1; and Fig. 5 is an enlarged perspective view showing a detail.

Before proceeding to a more detailed explanation of my invention it may be said in general, that the cultivator comprises a main frame and a cultivator frame. The latter is mounted to swing with respect to the main frame and can be adjusted and held in a plurality of positions. The form and the method of attachment of the cultivator frame to the main frame permit the position of the knives with respect to the ground to be adjusted at the will of the operator, and furthermore, permit the beam which carries the knives to be tilted with respect to the horizontal, so that the device can be used efficiently on a side hill or the like or when one wheel is running in a furrow or is otherwise at a lower elevation than the other.

In cultivating fields in which the crops are planted in irregular rows or arrangement, it is of course necessary so to guide the cultivator that the plants are not injured. It is a matter of difficulty to guide the cultivator accurately by directing the draft animals to one side or the other, without providing means for shifting the cultivator knives or blades when slight deviations alone are necessary. To permit the lateral movement of the knives, I arrange the cultivator frame so that it is freely movable laterally with respect to the main frame. The operator of the device, who is seated upon a trailing frame at the back of the cultivator, rests his feet upon suitable braces carried by the cultivator frame, and in this way is in a position to move the cultivator frame which carries the knives, to one side or the other, at the expense of little effort and with ease and rapidity. In this way the knives can be laterally displaced to avoid injury to the vegetation in irregularly planted or straggling rows.

Referring more particularly to the drawings, I provide the main frame 1 of the cultivator with a doubletree 2 secured upon the tongue 3 of the main frame by means of a bracket 4 or in any other common or preferred manner. The doubletree 2 has swingletrees 5 by means of which a horse or other draft animal can be attached at each side of the tongue 3. The main frame, at the rear of the double tree 2 has a bolster 6, extending transversely of the tongue and bolted or otherwise rigidly secured thereto. The bolster 6 has braces 7 secured thereto near its ends, and the opposite ends of the braces are firmly fastened by means of a bolt or in any other convenient manner to the tongue 3. Near each end at the under side, the bolster 6 has journal brackets 8, in which is revolubly mounted an axle 9 having at its ends wheels 10 which may be of any suitable type. If necessary, a further bracket 8ᵃ may be provided intermediate of the brackets 8, as shown in Fig. 3. The tongue 3 has its butt 11 extended rearwardly beyond the bolster, and secured by means of a bifurcated member 12 to a trailer frame 13. The latter has its rear end downwardly disposed and formed into a pivot which seats in a socket 14 of a fork 15. A trailer wheel 16 is revolubly mounted between the sides of the fork 15, and is arranged to trail upon the ground. The frame 13 has a seat standard 17 which carries the seat 18 for the operator of the cultivator.

Near each end, the bolster 6 has a substantially vertical guide sleeve 19, secured in position thereupon by means of an eye-bolt 23 or in any other suitable manner. I prefer to seat the sleeves 19 in recesses formed therefor in the rear face of the bolster. The sleeves are provided with caps 20 having openings 21 to permit oil or some other lubricant to be injected into the sleeve. The sleeves have the lower ends open and receive guide rods 22 which are free to move within and longitudinally of the sleeves. The lower extremities of the guide rods 22 are flattened and laterally disposed to form feet 24 upon which is carried a track beam 25 secured in position by means of bolts 26 or in any other convenient manner. The upper face of the track beam has a face plate 27 of iron, steel or other material adapted for the purpose.

Near each end, the axle 9 has rigid rearwardly projecting arms 28, connected by means of links 29 with brackets 30 secured at the ends of the track beam 25. Intermediate of its ends, the axle has a rigid rearwardly projecting ear 31 connected by means of a link 32 with the end of a hand lever 33. The latter is pivotally arranged upon the base 34 of a notched segment 35, securely mounted upon the bolster 6, by means of a bracket 36 provided for the purpose. The hand lever 33 has a spring controlled catch 37 adapted to engage the notched segment 35 to hold the hand lever in a plurality of positions. When the hand lever is released from the notched segment and moved in one direction or the other, it correspondingly rotates the axle 9 through the link 32 and ear 31. The axle when rotated, by means of the arms 28 and the links 29 raises or lowers the track beam 25.

The cultivator frame 1ª comprises forwardly converging side members 38, joined together at the adjacent ends by an upwardly disposed nose 39, fashioned from metal or other suitable material and securely mounted in position upon the members 38. The nose 39 has an opening 40 which receives the eye 41 of an eye-bolt 42, adjustably arranged in a slot 44 of a bracket 43. The latter is preferably fashioned from strip metal suitably bent into form and bolted or otherwise secured at the under side of the tongue 3. The eye-bolt 42 has a block 45 engaging the bracket 43, and a nut 46 by means of which the eye-bolt can be secured in a plurality of positions. By adjusting the eye-bolt with respect to the bracket, the cultivator frame can be adjusted with respect to the main frame. At the separated or rear ends, the members 38 carry a knife beam 47, arranged transversely of the members 38 and the tongue 3. The knife beam carries the cultivator knives or blades which are provided with shanks 48 secured upon the beam by clips 49 or in any other suitable manner. I prefer to employ at each end of the knife beam an oblique end knife 50, and intermediate of the end knives a V-shaped center knife 51. It will be understood of course, that knives of any common or preferred form can be employed. The members 38 between the knife beam and the bracket beam carry a transverse fulcrum bar 52, the ends of which are extended respectively beyond the members 38 and have pivotally mounted thereupon, levers 53. Each of the latter at its forward end has a roller 54. The opposite end of each of the levers 53 is joined by means of a link 55 with the end of a hand lever 56 pivoted upon a bracket 57 mounted upon the knife beam. Adjacent to each of the hand levers 56 is a notched segment 58 adapted to be engaged by a spring catch 59 carried by each lever 56, and serving to hold the latter in a plurality of positions. By means of the hand levers and the catches the levers 53 at one end can be firmly held with respect to the knife beam. At the opposite ends, the levers 53 carry the rollers 54, which are arranged to travel upon the track beam and thus to permit the cultivator frame to swing freely transversely of the main frame. At the same time the rollers 54 and the levers 53 serve to support the cultivator frame at the rear of the same. By adjusting one or the other of the levers, the cultivator frame and with it the knife beam, can be tilted with respect to the horizontal as is shown most clearly in Fig. 3. In this way the knives can be adjusted to allow for irregular ground, side hills and the like. By throwing one of the hand levers 56 forward, the corresponding lever 53 is lowered at its rear end, its roller 54 acting as a fulcrum, and the cultivator frame is therefore lowered at the side adjacent to this hand lever 56. By reversing this adjustment the frame can be raised at the same side. Thus by suitably adjusting the hand levers 56 the frame can be tilted in one direction or the other. It will be remembered that by means of the hand lever 33 the cultivator frame and the knives can be adjusted vertically.

The operator of the cultivator is carried upon the seat 18 and places his feet upon foot-rests 60 mounted upon the knife beam. By means of the foot-rests the operator can easily displace the cultivator frame to one side or the other as is found necessary in guiding the cultivator between the rows of vegetation.

I wish to emphasize that the features of my invention lie not in the constructive details illustrated, for example, in the accompanying drawings, but that the invention resides primarily in the provision of a main frame and a cultivator frame, the adjustable mounting of the latter, and the means for controlling the movements and position of the cultivator frame.

Having thus described my invention I claim as new, and desire to secure by Letters Patent:

1. In a cultivator, in combination, a main frame, a cultivator frame secured to said main frame and arranged to swing freely transversely thereof and to be tilted, and means for adjusting said cultivator frame to tilt it.

2. In a cultivator, in combination, a main frame, a cultivator frame secured to said main frame and arranged to swing freely transversely thereof and to be tilted, said cultivator frame further being movable toward and away from said main frame, means for adjusting said cultivator frame to tilt it, means for adjusting said cultivator frame to approach or withdraw it from said main frame, and means for holding said cultivator frame in a plurality of positions.

3. In a cultivator, in combination, a main frame, a cultivator frame arranged to swing with respect to said main frame, means for adjusting said cultivator frame vertically, and means for tilting said cultivator frame, said cultivator frame being free at all times to move transversely of said main frame.

4. In a cultivator, in combination, a main frame, a cultivator frame arranged to move with respect to said main frame, means for adjusting said cultivator frame vertically, means for tilting said cultivator frame, said cultivator frame being free at all times to move transversely of said main frame, means for holding said cultivator frame in a plurality of tilted positions, and means for holding said cultivator in a plurality of positions at different distances from said main frame.

5. In a cultivator, in combination, a main frame, a cultivator frame arranged to swing with respect to said main frame, means for adjusting said cultivator frame vertically, means for tilting said cultivator frame, means for holding said cultivator frame in a plurality of tilted positions, means for holding said cultivator frame in a plurality of positions at different distances from said main frame, and a trailer frame adapted to carry an operator, said cultivator frame being at all times freely movable transversely of said main frame, and being arranged to be moved to either side by the operator on said trailer frame.

6. In a cultivator, in combination, a main frame, a cultivator frame mounted to swing with respect to said main frame, a member adjustably secured to said cultivator frame and slidably engaging said main frame, and means for adjusting said member at said cultivator frame.

7. In a cultivator, in combination, a main frame, a cultivator frame mounted to swing with respect to said main frame, a member pivoted upon said cultivator frame and resting upon said main frame and adapted to slide thereupon, and means for adjusting said member at said cultivator frame.

8. In a cultivator, in combination, a main frame having a track beam, a cultivator frame arranged to swing with respect to said main frame, a lever pivoted upon said cultivator frame and having an end slidably resting upon said track beam, and means for adjustably holding the other end of said lever at said cultivator frame.

9. In a cultivator, in combination, a main frame, a cultivator frame arranged to swing with respect to said main frame, a member at each side of said cultivator frame and engaging said main frame, and independent means for adjusting said members at said cultivator frame.

10. In a cultivator, in combination, a main frame having a track beam adapted to serve as a guiding support, a cultivator frame arranged to swing with respect to said main frame, a lever at each side of said cultivator frame and having an end slidably resting upon said track beam, and means for adjustably holding the other end of each of said levers at said cultivator frame.

11. In a cultivator, in combination, a main frame having a track beam adjustable vertically and adapted to serve as a guiding support, a cultivator frame arranged to swing with respect to said main frame and having a knife beam, levers pivoted upon said cultivator frame and each having at one end a roller arranged to travel upon said track beam, hand levers mounted upon said cultivator frame and each secured to the end of one of said levers remote from the roller thereof, and independent means for holding said hand levers in a plurality of positions.

12. In a cultivator, in combination, a main frame having a bolster, an axle revolubly carried by said bolster and having a rigid arm and a rigid ear, a track beam connected to said arm and adapted to serve as a guiding support, a hand lever connected to said ear, means for holding said hand lever in a plurality of positions, and a cultivator frame controlled by said track beam.

13. In a cultivator, in combination, a main frame having a bolster, an axle revolubly carried by said bolster and having a rigid arm and a rigid ear, said bolster having a guide sleeve, a track beam having a guide slidably arranged in said sleeve and movable with respect to said main frame, said track beam being adapted to serve as a guiding support a link connecting said beam and said arm, a pivoted hand lever operatively connected with said ear, means for holding said hand lever in a plurality of positions, and a cultivator frame controlled by said track beam.

14. In a cultivator, in combination, a main frame, a cultivator frame mounted to swing with respect to said main frame, said cultivator frame being adjustable in a plurality of directions, means for holding said cultivator frame in a plurality of positions, a member pivoted upon said cultivator frame and resting upon said main frame and adapted to slide thereupon, and means for adjusting said member at said cultivator frame.

15. In a cultivator, in combination, a main frame, a cultivator frame arranged to swing freely with respect to said main frame transversely thereof, a member at each side of said cultivator frame and engaging said main frame slidably, independent means for adjusting said members at said cultivator frame, said cultivator frame being adapted to be tilted, means for adjusting said cultivator frame, and means for holding the same in a plurality of positions.

16. In a cultivator, in combination, a main frame having a bolster, an axle revolubly carried by said bolster and having a rigid arm and a rigid ear, a track beam connected to said arm, a hand lever connected to said ear, means for holding said hand lever in a plurality of positions, a cultivator frame arranged to swing freely transversely of said main frame and having a knife beam, levers pivoted upon said cultivator frame and each having at one end a roller arranged to travel upon said track beam, hand levers pivoted upon said cultivator frame and each secured to the end of one of said levers remote from the roller thereof, and independent means for holding said hand levers in a plurality of positions.

17. In a cultivator, in combination, a main frame, a cultivator frame having at one end a pivotal connection with said main frame, means for adjusting said pivotal connection, means for tilting said cultivator frame, means for approaching and separating said frames, and means for holding said cultivator frame in a plurality of positions, said cultivator frame being free to move at all times transversely of said main frame.

18. In a cultivator, in combination, a main frame having a bracket presenting a slot, a cultivator frame having a nose, and a bolt pivotally connected to said nose and having a block engaging said bracket, said bolt being slidably arranged in said slot and having an adjustable nut serving to secure said bolt in said slot in a plurality of positions.

In testimony whereof I have signed my name to this specification in the presence of two subscribing witnesses.

AUGUSTUS CARL LODWIG.

Witnesses:
F. M. KIRK,
GEO. E. HUME.